United States Patent [19]

Ackley

[11] 4,266,478

[45] May 12, 1981

[54] MATERIAL ORIENTATION AND PRINTING APPARATUS AND METHOD

[76] Inventor: E. Michael Ackley, 1273 N. Church St., Moorestown, N.J. 08057

[21] Appl. No.: 65,337

[22] Filed: Aug. 9, 1979

Related U.S. Application Data

[63] Continuation-in-part of Ser. No. 954,243, Oct. 24, 1978.

[51] Int. Cl.³ .................... B65G 47/24; B41F 17/36
[52] U.S. Cl. ..................... 101/40; 101/426; 198/377
[58] Field of Search .................. 101/40, 426; 198/377

[56] References Cited

U.S. PATENT DOCUMENTS

| | | | |
|---|---|---|---|
| 2,079,300 | 5/1937 | Nunnikhoren | 101/40 |
| 2,399,630 | 5/1946 | Friden | 101/40 |
| 2,643,778 | 6/1953 | Socke | 198/377 |
| 3,960,073 | 6/1976 | Rush | 101/40 |
| 4,167,226 | 9/1979 | Ackley | 101/40 X |
| 4,189,996 | 2/1980 | Ackley, Sr. et al. | 101/40 X |

*Primary Examiner*—Clifford D. Crowder

[57] ABSTRACT

An apparatus and process for transporting, orienting and printing indicia upon materials which have dissimilar ends, like capsules, in a predetermined orientation and position. The apparatus includes three rotatable drums in tangential arrangement. The first two drums each include a plurality of peripherally spaced pockets sized and shaped to receive and carry individual capsules. Means are provided for each drum to orient certain preselected capsules from a radial to a longitudinal position with a selected end trailing. The so-oriented capsules are then delivered to the third drum for further processing, like printing, such as spin-printing. Means are provided to receive the longitudinally oriented capsules from the second drum in a longitudinal orientation, and to rotate the capsules from the longitudinal to a transverse orientation, whereupon selected indicia may be applied to the capsules. The third drum including the printing means is also capable of use alone, separate from the first two drums, to apply indicia to a variety of materials or bodies having both similar and dissimilar ends, e.g. capsules, pellets or tablets. Printing is preferably accomplished using a spin printing apparatus which, unlike spin printing apparatus of the prior art, operates upon materials traversing a curving path.

42 Claims, 4 Drawing Figures

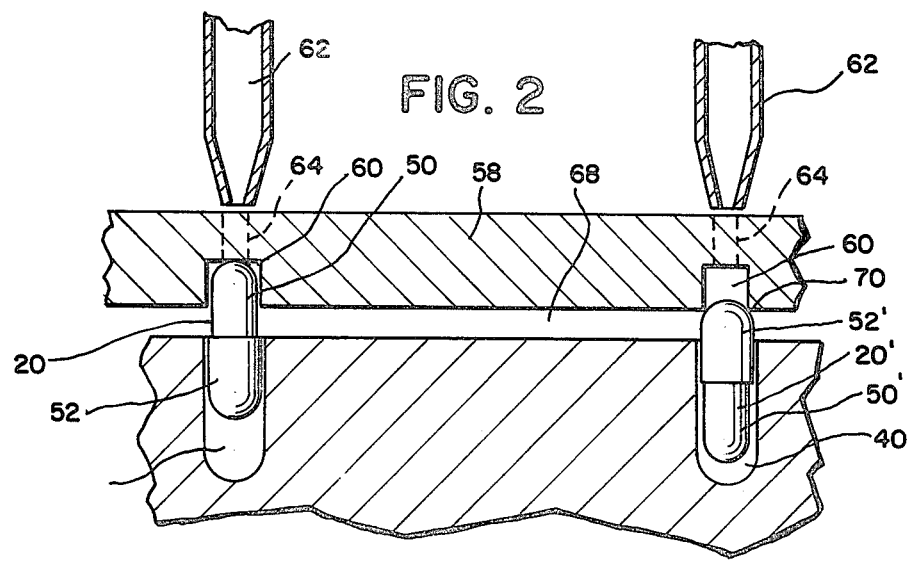
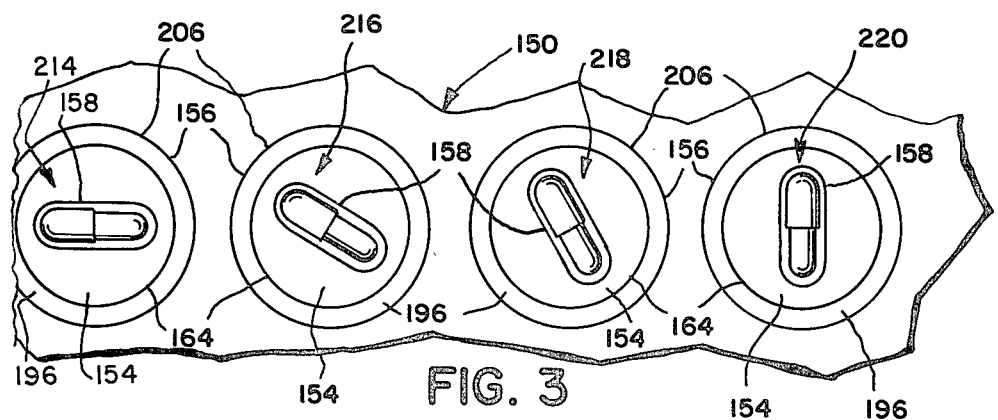
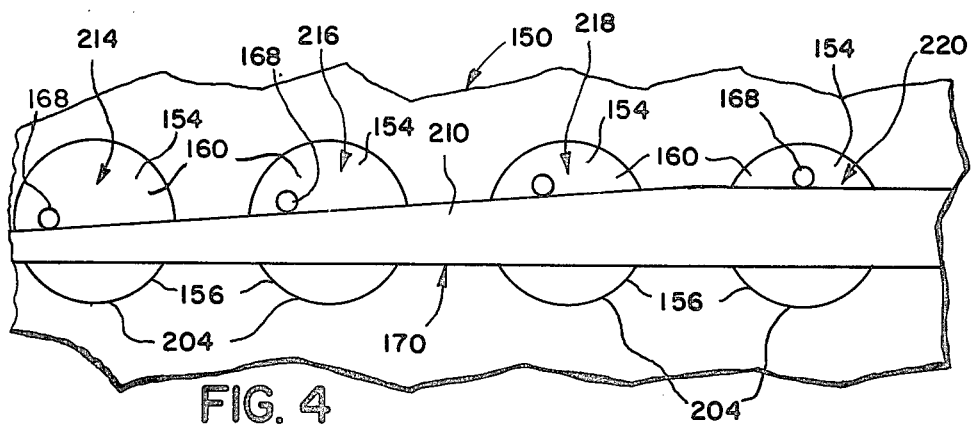

MATERIAL ORIENTATION AND PRINTING APPARATUS AND METHOD

TECHNICAL FIELD

This application is a continuation-in-part of U.S. application Ser. No. 954,243, filed Oct. 24, 1978.

This application relates generally to the field of capsule orienting apparatus and more particularly, is directed to a multi-drum type of capsule orientation, rectification and printing apparatus including a plurality of tangentially registered pockets which function with exteriorly positioned air jet guides and other means to uniformly orient randomly fed capsules, and means for receiving the uniformly oriented capsules for subsequent processing, in particular the printing of indicia upon the capsules.

It is the usual practice to package medicinal compounds and other materials suitable for ingestion in capsules which are made and used in very large numbers. The capsules generally consist of bodies of predetermined size and configuration to hold the medicinal and other compounds and caps which are telescopically arranged over the bodies to retain the filled material therewithin.

During the processing of the capsules, which may be filled or empty, it is common practice to imprint indicia over the surface of the capsules, for example the name of the manufacturer or of the name or batch number of the material packaged within the capsule or other information required by the Food and Drug Administration or other agencies. This can be done by "spin printing" an elongated indicia on the capsule or by printing the capsule in another suitable manner. Spin printing is accomplished by causing the capsule to spin about its axis as the indicia is imprinted upon the surface of the capsule. The capsules may be uniformly oriented or rectified prior to reaching the imprinting station whereby the capsules can be uniformly rotated during the imprinting operation. The rotation occurs in a manner which allows rotation of the capsule without substantial slippage between the imprinting head and the capsule surface whereby a sharp, precise, printed indicia can be produced on each capsule as it passes through the imprinting station.

BACKGROUND OF THE INVENTION

Prior workers in the art have developed apparatus capable of transporting, orienting, rectifying and in other appropriate ways positioning, etc. for printing capsules, such as are disclosed in the following U.S. patents, which may be considered representative of the prior art:

U.S. Pat. No. 2,785,786, R. J. Bartlett, CONVEYING APPARATUS

U.S. Pat. No. 2,859,689, A. Ackley, PELLET MARKING MACHINE

U.S. Pat. No. 2,931,292, C. E. Ackley, MARKING MACHINES

U.S. Pat. No. 2,982,234, C. E. Ackley and John Kane, METHOD OF PRINTING WAXED PELLETS, AND PRINTING INK U.S. Pat. No. 3,026,792, J. J. Miskel et al, APPARATUS FOR BRANDING UNIFORMLY SHAPED ARTICLES U.S. Pat. No. 3,042,183, C. E. Ackley, ARTICLE HANDLING APPARATUS U.S. Pat. No. 3,200,556, C. E. Ackley, CAPSULE SEALING METHOD AND APPARATUS U.S. Pat. No. 3,272,118, C. E. Ackley, ARTICLE MARKING MACHINE U.S. Pat. No. 3,613,861, Alten E. Whitecar, CAPSULE ORIENTING MACHINE U.S. Pat. No. 3,739,909, Garland et al, CAPSULE HANDLING APPARATUS AND METHOD U.S. Pat. No. 3,838,766, Wagers, Jr. et al, CAPSULE INSPECTION APPARATUS AND METHOD U.S. Pat. No. 3,868,900, Edward M. Ackley, CAPSULE PRECISION PRINTING APPARATUS AND METHOD U.S. Pat. No. 3,871,295, Edward M. Ackley, CAPSULE ORIENTING APPARATUS AND METHOD OF SPIN PRINTING U.S. Pat. No. 3,884,143, Edward M. Ackley, CONVEYOR LINK FOR TABLET PRINTING APPARATUS U.S. Pat. No. 3,912,120, Hoppmann et al, CENTRIFUGAL METHOD OF SORTING AND ORIENTING PARTICULATE ARTICLES U.S. Pat. No. 3,917,055, VandenBerg et al, CAPSULE RECTIFICATION APPARATUS U.S. Pat. No. 3,931,884, Edward M. Ackley, APPARATUS FOR TRANSPORTING AND ORIENTING CAPSULES U.S. Pat. No. 4,069,753, Edward M. Ackley, deceased, APPARATUS AND METHODS FOR THE RANDOM SPIN PRINTING OF CAPSULES U.S. Pat. Nos. 3,931,884 and 4,069,753 show "spin printing" apparatus, and U.S. Pat. Nos. 2,785,786, 2,859,689, 3,026,792 and 3,424,082, show other apparatus and methods for branding or printing indicia on the article.

The present apparatus represents an improvement over the prior art capsule orientation and printing machines for many reasons, e.g. more versatile, greater efficiency and for other reasons as will become apparent from the further description. It provides a reliable, automatic and rapidly functioning device capable of rapidly and uniformly orienting a plurality of randomly fed capsules for subsequent printing operations.

In view of these patents and a fairly advanced state of technology, the present machinery and method is quite unobvious and represents a further significant advance in the art.

DISCLOSURE OF THE INVENTION

In accordance with the present invention, a marked departure has been made from indicia application techniques of the prior art. Indicia applying apparatus of the prior art operate upon a material or body which is being drawn through the printing station along a generally linear path. It has been discovered that drawing the material or body upon which indicia are to be applied through the printing station, in particular a spin printing apparatus, along a curved path, provides significant advantages over the prior art material handling machinery.

The technique of printing indicia (primarily by spin printing) upon materials along a curved path is equally applicable to materials or bodies having either similar or dissimilar ends.

In conjunction with materials having similar ends, such as pellets, tablets or soft gelatin capsules, the materials to which indicia are to be applied are first placed upon a pocket carrier drum, being received within a plurality of pockets peripherally spaced about the drum, in whatever orientation is desired for a given application. The pockets are formed as part of a plurality of carriers which are adapted for rotation about an axis radially oriented to the drum. In this manner, the materials are then easily rotatable from the position in which they are received to whatever position is indicated for the proper application of indicia to such materials. The drum then draws the materials beneath the printing apparatus, preferably a spin printing apparatus. Unlike devices of the prior art, the materials proceed along a curving path, beneath the printing apparatus, permitting an increased rate of production, as well as providing improved results.

In conjunction with materials having dissimilar ends, such as hard shell gelatin capsules comprising a body and a telescopically arranged cap, the materials to which indicia are to be applied are first rectified as follows. First the capsules are loaded from a supply hopper individually into a plurality of peripheral cavities or pockets which are provided about the periphery of a feed drum. Each of the pockets is similarly formed and is characterized by a radially extending portion and a communicating longitudinally or circumferentially extending portion. The capsules are fed from the hopper and may be randomly received in the feed drum pockets, but preferably, the capsules are fed in radial orientation to the radially directed portion. In other of the pockets, the capsules may be in longitudinal orientation within the circumferentially directed portion. Either the body or the cap may be positioned radially inwardly within the radial portions of the pockets and either the body or the cap may be positioned in the leading or forward position within the longitudinal portions of the pockets in view of the random feeding from the hopper. Thus, the capsules are randomly positioned each in one pocket, either in the longitudinal or radial pockets, which are at a 90° angle with respect to each other in one single plane.

Optionally, a vacuum chest is located immediately adjacent the inner surface of the feed drum if it is desired to assist the positioning of the capsule in the pocket in radial position.

A brush means which may be rotating is positioned downstream from the feed hopper and is positioned in tangential arrangement with the feed drum.

When, as described, a capsule is seated on the radial cavity of the pocket, a capsule which falls into the longitudinal pocket of the cavity will not fit into it because of the radially seated capsule. However, the capsule may partially be in the longitudinal cavity. The brush means assists to dislodge any such longitudinal capsules.

Thus, at this phase of the operation, the pockets have their cavity occupied by either a longitudinally or radially seated capsule as the feed drum rotates each pocket away from the rotating brush means.

If preferred, the position of the brush and vacuum means may be interchanged, so that the vacuum chest will assist in positioning all radially oriented capsules.

The apparatus includes a sizing block and back guide circumferentially arranged in overlying relationship to the feed drum downstream of the vacuum and brush means when these are used. The sizing block and back guide means comprises a circumferential channel or slot of sufficient size to receive the capsule body in rotary, sliding engagement therewithin and of insufficient size to permit the capsule cap to enter and rotatably slide therewithin.

The sizing block and back guide means further comprises an air jet oriented to direct a jet stream of air upon each respective pocket as the pocket is rotated beneath the air jet. The air jet operates to lift the radially seated capsule upwardly on an air cushion to bring it out of the cavity. The air jet impinges on the longitudinal cavity, then streams into the radial cavity to create the necessary uplift pressure.

The capsules which had randomly been positioned within the radial portion of the pocket with the cap radially inwardly (or downwardly) positioned and the body radially outwardly (or upwardly) positioned are urged upwardly or radially outwardly until the outward portion of the body enters the arcuate slot. There the capsule pivots from the radial position to the longitudinal position. The sizing block and back guide means then act to retain the capsule so pivoted in the longitudinally aligned position as the feed drum is rotated. Thus, the capsules which are longitudinally aligned are travelling with their cap portion trailing. The capsules which are remaining in the radially extending pocket, are processed as follows.

Those capsules originally oriented within the radially directed portions of the pocket with the cap facing radially outwardly will not be pivoted to the longitudinal position inasmuch as the arcuate slot is of insufficient width to receive the cap in rotary, sliding engagement therewithin. Accordingly, the action of the air jet will merely serve to slightly elevate or float the capsule within the pocket until the cap bumps against the marginal edges of the arcuate slot which edges then act to prevent further radially outwardly movement of the capsule. Accordingly, once the capsules with the caps positioned radially outwardly are rotated past the influence of the air jets, these capsules will remain radially oriented and seated within the radial portions of the pockets in the same orientation as originally deposited from the feed hopper.

A transfer drum of similar configuration to the feed drum is tangentially arranged and is rotatably driven in synchronism with the feed drum whereby the pockets in the transfer drum are tangentially brought into register with the pockets in the feed drum as the feed drum and the transfer drum are rotated in synchronism.

Those capsules which were longitudinally oriented by the air jet in the feed drum will be received in the transfer drum in the same longitudinal alignment. Those capsules which were radially oriented with the cap outwardly positioned will be radially transferred to a corresponding pocket in the transfer drum. The transfer of the capsules, whether in longitudinal or radial position, ideally proceeds by gravity. It may be assisted by air, such as an air jet which helps to dislodge and transfer the capsule. The transfer may also be assisted by a vacuum created in the pocket in which the capsule will be transferred, or other means. When the capsule has been transferred to the radial portion of the pocket in the transfer drum, its position is such that it will essentially have been turned upside down.

Unlike the apparatus described in U.S. Pat. No. 4,069,753 where the transferred capsules are turned from a transverse direction with respect to the machine travel, in the apparatus and method herein described the capsules remain in the same plane, i.e., radially, but they are inverted in the transfer. Moreover, the pockets of the apparatus described herein need not, and are not configured as the pockets of said patents which include a generally radially-directed pocket, a generally longitudinally-directed pocket, and a generally transversely-directed pocket. Nor does the pocket herein described need an angularly sloping bottom surface as described in said patent.

It is to be noted that an important object of that patent and others designated above, is to dispose the capsule in a position well suited for direct spin printing, i.e., in the transverse position relative to the direction of the machine travel. Although not so positioned in the second drum, the machine in accordance with the present invention is provided with a third drum which then disposes the capsules in a position best suited for spin printing.

A second or lower back guide circumferentially overfits the transfer drum and is similarly equipped with an air jet means. As the transfer drum is rotated past the air jet, those capsules that are already longitudinally positioned in the longitudinal portion will be traversed through the lower back guide without further orientation, with the body portion leading and the cap trailing. Those capsules which are radially positioned within the radially directed portions of the feed drum pockets, i.e. the capsules with their cap now radially inwardly positioned, will be acted upon by the air jet. The air jet thus assists to raise the capsule cap portion out of the pocket and to introduce the body into the arcuate space defined between the surface of the transfer drum and the back guide. The air jet acts to longitudinally align such capsules in the longitudinal portions of the pockets with the body portion leading and the cap trailing. Thus, the air operates in cooperation with the rotary movement of the drum and the occasional frictional engagement of the capsule with the inner portion of the back guide as the drum rotates, and the pivoting movement of the capsule about the inside shoulder of the pocket.

Thus the capsules will be similarly oriented after handling by the feed drum and the transfer drum, whereby each oriented capsule is positioned within the longitudinally extending portion of the pocket with the body in leading orientation and with the cap in trailing position. Capsules which have not been properly oriented by the feed drum and the transfer drum will generally be radially oriented and can therefore readily be removed from the transfer drum, rather than being delivered for further processing.

A second vacuum chest may be provided to assist in the positioning of the capsules in this second drum.

Then, in accordance with the present invention, a pocketcarrier drum is tangentially arranged and is rotatably driven in synchronism with the transfer drum whereby pockets of the carrier drum are brought into register with the pockets in the transfer drum as the carrier drum and transfer drum are rotated in synchronism. The oriented capsules are longitudinally transferred from the transfer drum to the carrier drum.

The carrier drum is again provided with a plurality of rotatable carrier means, each having a pocket for receiving a capsule therein. The carrier means are each adapted to rotate in response to a cam and follower mechanism which is timed so that the capsule is re-oriented from a longitudinal to a transverse position just prior to entering the printing stage of operation. The capsule is then positioned in a manner which is conducive to the printing on that capsule of any desired indicia, primarily by "spin printing" techniques.

The printed capsules are then delivered from the printing drum for further processing, e.g. packaging. The capsules are preferably delivered from the carrier drum in their transverse orientation, so that they may be rolled to the next stage of processing. The carrier means are then returned to their original orientation, with their pockets longitudinally aligned, in order to accept further capsules for printing. It is also possible to first return the carrier means to this original position, and then deliver the capsules from the carrier drum, if desired.

An air jet means may be provided at the position where the capsules are delivered from the carrier drum, which air jet is positioned to assist the capsules in their movement.

Although the pocket carrier drum illustrated is particularly well adapted to receive and process a capsule from a feed drum and transfer drum which have already received an uniformly oriented a series of capsules for subsequent processing, it is important to note that the carrier drum illustrated is equally capable of operating alone, or in conjunction with other machinery, having applicability to a wide variety of materials to be processed, such as pellets, tablets, and both soft and hard shell gelatin capsules.

It is therefore an object of the present invention to provide an improved capsule rectification and printing apparatus of the type set forth.

It is another object of the present invention to provide novel capsule rectification and printing apparatus that is completely automatic in operation and which is designed to simply and speedily rectify a plurality of randomly fed capsules for the printing on the capsules of any desired indicia.

It is an important object of the present invention to provide an apparatus wherein the capsules are rectified and oriented in the one plane, the plane of rotation, for delivery to a printing means.

It is another object of the present invention to provide a novel capsule rectification and printing apparatus comprising a feed drum and a tangential transfer drum including a back guide means and an air jet means associated with each drum, wherein at least some of the capsules transported by the feed drum are longitudinally oriented by the feed drum air jet means and whereby the remaining capsules are longitudinally oriented by the air jet streams associated with the transfer drum, and a carrier drum in tangential arrangement with the transfer drum, which carrier drum receives the longitudinally oriented capsules, rotates the capsules from the longitudinal to a transverse orientation, and then causes the transversely oriented capsules to pass through a printing apparatus.

It is another object of the present invention to provide a novel capsule rectification and printing apparatus which includes a first feed drum which picks up capsules from a hopper in random arrangement, first orientation means to selectively rectify some of the capsules in the feed drum to a longitudinal position with respect to the path of movement, transfer means to transfer longitudinally oriented capsules from the first feed drum to a second transfer drum in longitudinal alignment, said transfer means further transferring radially oriented capsules from the first feed drum to the second transfer drum in radial alignment, second orientation means to longitudinally orient the remaining of said capsules in the second transfer drum and, in accordance with the present invention, transfer means to transfer the longitudinally oriented capsules from the second transfer drum to a third carrier drum in a longitudinal orientation, third orientation means to transfer the longitudinally oriented capsules to a transverse orientation, and printing means for applying indicia to the transversely oriented capsules.

In this manner the capsules are located on the carrier drum in a position ideally adapted for "spin printing". By eliminating the third orientation means it is also possible to leave the capsules in a longitudinal orientation with respect to the direction of travel, allowing indicia to be applied to the capsules using other printing techniques.

It is another object of the present invention to provide a novel capsule rectification and printing apparatus comprising a hopper containing a large number of capsules in random arrangement, first and second rotary drum means and first and second guide means including air jets, all of which are adapted to sort out and orient the capsules so that they are uniformly spaced apart about the second drum means in longitudinal orientation with the capsule body forwardly positioned and with the capsule caps rearwardly positioned relative to the direction of travel, and third rotary drum means adapted to receive the longitudinally oriented capsules from the second drum means in a longitudinal orientation, to transfer the longitudinally oriented capsules to a transverse orientation, and to print indicia on the transversely oriented capsules.

It is another object of the present invention to provide a novel capsule rectification and printing apparatus comprising a first feed drum, said drum including a plurality of pockets each having a radially directed portion and a longitudinally directed portion, a first capsule orientation means associated with the feed drum to longitudinally orient at least some of the capsules contained within the pockets, a transfer drum in tangential arrangement and synchronized movement with the feed drum, the transfer drum comprising a plurality of similar pockets each having a radially directed portion and a longitudinally directed portion, a second orientation means associated with the transfer drum whereby all capsules not longitudinally oriented by the first orientation means will be oriented in the transfer drum pocket by the second orientation means, and a carrier drum in tangential arrangement and synchronized movement with the transfer drum, the carrier drum comprising a plurality of carrier means including pockets adapted to be brought in register with the pockets of the transfer drum as the capsules are delivered from the transfer drum to the carrier drum, and a third orientation means associated with the carrier drum whereby the longitudinally oriented capsules are transferred to a transverse orientation for the printing of indicia thereon.

It is another object of the present invention to provide a novel capsule rectification and printing apparatus that is simple in design, yet versatile and efficient.

Other objects and a fuller understanding of the invention will be had by referring to the following description and claims of a preferred embodiment thereof, taken in conjunction with the accompanying drawings, wherein like reference characters refer to similar parts throughout the several views, and in which:

BRIEF DESCRIPTION OF THE DRAWINGS

FIG. 2 is an enlarged, fragmentary, cross sectional view taken along line 2—2 of FIG. 1, looking in the direction of the arrows.

FIG. 3 is an enlarged, fragmentary, cross sectional view taken along line 3—3 of FIG. 1, looking in the direction of the arrows.

FIG. 4 is an enlarged, fragmentary, cross sectional view taken along line 4—4 of FIG. 1, looking in the direction of the arrows.

DESCRIPTION OF THE PREFERRED EMBODIMENTS OF THE INVENTION

Figure 1:
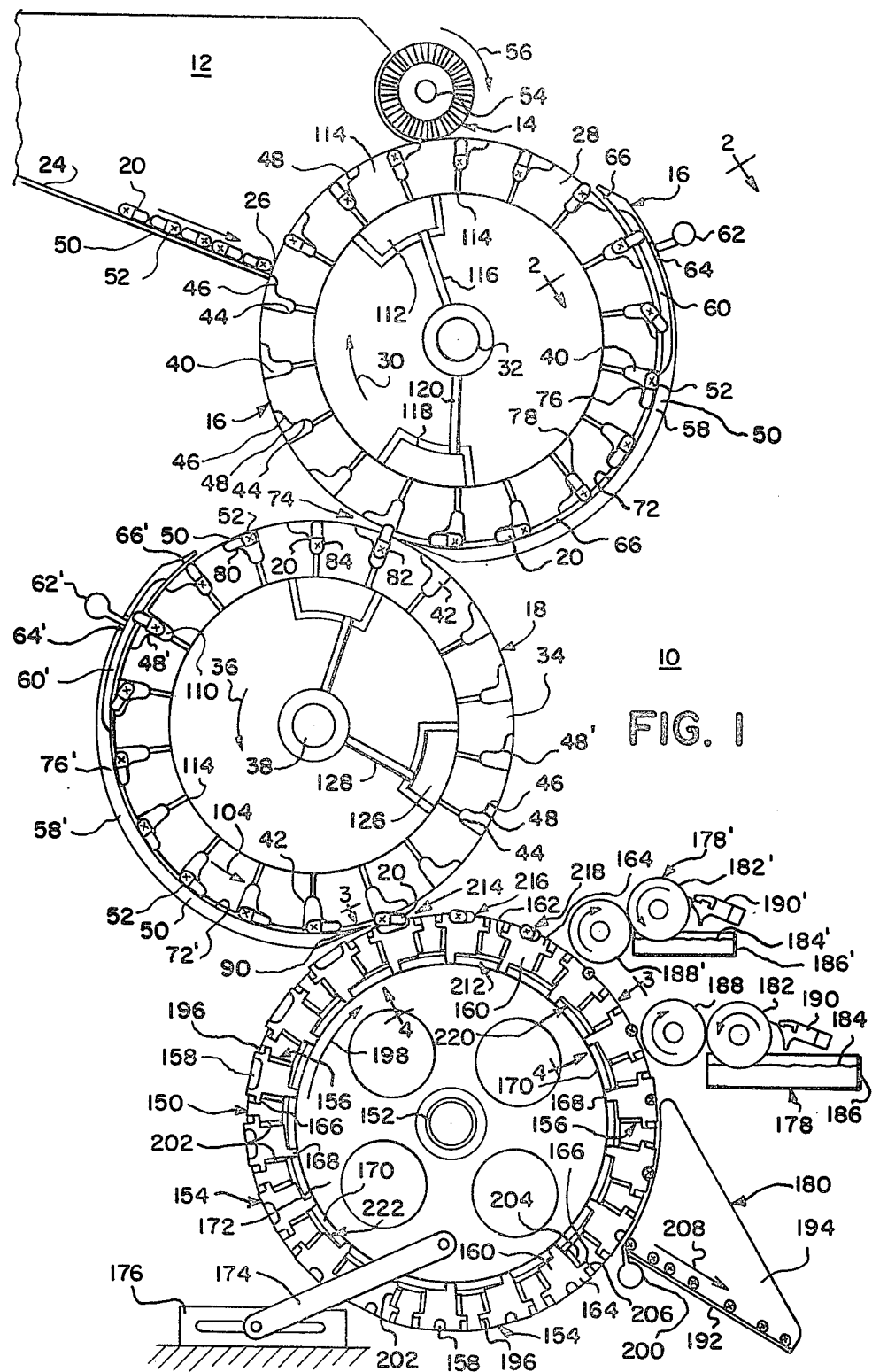
FIG. 1 is a side elevational view, partly in section, illustrating the preferred embodiment of the invention.

Although specific terms are used in the following description for the sake of clarity these terms are intended to refer only to the particular structure of the invention selected for illustration in the drawings, and are not intended to define or limit the scope of the invention.

Referring now to the drawings, there is illustrated in FIG. 1 a capsule rectification apparatus designated 10 which comprises generally a hopper means 12, a rotary brush means 14, a feed drum means 16, a transfer drum means 18, and a carrier drum means 150, all of which cooperate to rectify a plurality of randomly oriented capsules 20 for printing or marking.

The hopper means 12 is mounted in stationary relationship upon a suitable support (not shown) and includes an inclined bottom 24 which terminates at a capsule opening 26 to facilitate feeding the capsules 20 one at a time to the drum means 16. As shown, the angle of inclination of the hopper bottom 24 is designed to radially align the bottom whereby the individual capsules will be radially fed toward the feed drum means 16.

However, a hopper may be used from which the capsules will be fed not only radially but also deposited in a longitudinal position in the cavity.

The feed drum means 16 comprises generally a feed drum 28 which is rotated in the direction of the arrow 30 by its associated shaft 32 in known manner. A similarly configured transfer drum 34 rotates in substantially tangential relationship below the feed drum 28 in the direction of the arrow 36 upon rotation of its affixed shaft 38. The shafts 32, 38, and their respectively affixed drums 28, 34 are rotated in synchronism by a motor and drive apparatus (not shown) in a suitable manner well known to those skilled in the art.

The feed drum 28 and transfer drum 34 are similar in construction and are each provided with a plurality of equally spaced, peripherally positioned, uniformly configured, capsule receiving pockets or depressions 40, 42. While a single peripheral row of pockets 40, 42 in each of the drums 28, 34 is illustrated, it will be appreciated that other similar rows can by transversely arranged about the peripheries of the respective feed drum 28 and transfer drum 34 to similarly feed and rectify simultaneously greater numbers of capsules 20, if so desired.

Still referring to FIG. 1, it will be observed that the feed drum pockets 40 and the transfer drum pockets 42 are substantially identical in that both pockets comprise a radially extending portion 44 and a communicating, longitudinally extending portion 46 which portions are defined one from the other by an intermediate shoulder 48. In other respects, the pockets in the respective drums can differ from each other. For instance, while there is a need for shoulder 48 or equivalent means to assist in the pivoting of the capsule, in the feed drum, there is no such requirement in the pockets in the transfer drum, where such shoulder 48' can well be shaped differently, e.g., be more slanted or at an incline, or otherwise as desired. The radially extending portions 44 and longitudinally extending portions 46 of the feed drum pockets 40 and transfer drum pockets 42 are sized and configured to receive and retain one of the capsules 20.

As hereinbefore set forth, the capsules can be conventional in configuration and comprise a generally cylindrical body 50 with a generally cylindrical cap 52 in overfitting, telescopic arrangement. The diameter of the cap 52 is slightly greater than the diameter of the capsule body 50 and it is this difference in size that is utilized for capsule rectification purposes in the manner hereinafter more fully described.

As illustrated, in FIG. 1, a plurality of randomly oriented capsules 20 feed along the inclined bottom 24 of the hopper means 12 through the opening 26, and one capsule individually enters each of the pockets 40 as the feed drum 28 is rotated in the direction of the arrow 30. The capsules 20 will be presented to the feed drum 28 in generally radial orientation and will be received within the radially extending portions 44 of the feed drum pockets 40. Some of the capsules 20 will fall naturally into the radially extending portions 44 in an upright position with the respective bodies 50 positioned radially outwardly from the caps 52. Others of the capsules 20 will fall naturally with the respective caps 52 positioned radially outwardly from the respective bodies 50; capsules fed to the hopper are initially in haphazard or random orientation. As the capsules gradually descend in the hopper, they become aligned into a radial position with the assistance of conventional combs or "fingers'-'—forming channels to form rows of the so-arranged capsules. It is to be noted however, that is a hopper is not so constructed, the capsules will fall also into the longitudinal cavity of the pockets and then be processed in accordance with the apparatus and method of the invention.

A vacuum chest 112 is positioned and functions as described hereinafter.

A rotary brush means 14 is positioned arcuately downstream from the hopper means 12 and is rotated by its shaft 54 in the direction of the arrow 56 to assist in sweeping out and away any capsules 20 that might be lying in a generally longitudinal position partially overlapping with a capsule in the radial position, and to assist in sweeping any longitudinally oriented capsules into a radial position within its associated radially extending cavity portion 44, when that cavity is free.

Referring now to FIGS. 1 and 2, it can be observed that feed drum means 16 further comprises an arcuate sizing block and back guide 58 which is positioned in circumferentially overlying relationship to the feed drum 28 at the lower quadrant thereof. At the upstream end, the sizing block and back guide 58 is provided with an arcuate slot 60 which extends in length over one or more of the spaced pockets 40 to facilitate capsule rectification therewithin. The sizing block and back guide 58 is spaced peripherally outwardly from the surface of the feed drum 28 to define an aligning space 66 therebetween, which space is less in width than the diameter of the body 50 of a capsule 20. The block and back guide 58 can be positioned anywhere against the feed drum in the space downstream the hopper and upstream the transfer point from one to the other drum. The length of the slot is a matter of judicious choice: when the rotational speed of the drum is comparatively fast, the slot preferably will extend over a plurality of pockets; desirably it will be shorter when the speed is lower. It is evident that the invention contemplates such slots or spaces to be of any length as may be desired.

Associated in operation with the feed drum means 16, an air jet 62 is suitably supported and positioned to direct a radial air stream through an opening 64, provided in the guide 52, into arcuate slot 60 for capsule orientation in the manner hereinafter more fully set forth.

Still referring to FIG. 2, two possible conditions are illustrated. In the left representation the capsule cap 52 is radially inwardly positioned within the radially extending pocket portion 44. In the right representation, the capsule body 50 is radially inwardly positioned within the radially extending pocket portion 44. Observing particularly the left representation, upon application of a jet of air from the air jet 62 through the opening 64, the air jet stream will impinge directly upon the pocket portions 46, 44 as the feed drum 28 is rotated. The directed air stream extends radially inwardly to the bottom of the radially extending pocket portion 44 where it turns and by applying forces against the bottom of the capsule, tends to urge the capsule 20 radially outwardly. In the case of the left representation in FIG. 2, it will be observed that the width of the slot 60 is just sufficient to admit the body 50 of the capsule 20 in rotary, sliding engagement therewithin. Once the capsule 20 has been raised within its respective pocket 40 by the force from the air jet 62, the capsule 20 will float within the space defined between the pocket 40 and the guide 58 and will pivot about the intermediate shoulder 48 to enter the longitudinally extending portion 46 of its pocket 40 in the manner illustrated in FIG. 1. The aligning space 66 defined between the outer periphery of the feed drum 28 and the guide 58 is just sufficiently wide to permit passage of a capsule 20 in its longitudinally aligned position, with capsule body 50 forwardly positioned within the space 66 when positioned in a longitudinally extending pocket portion 46.

It may be noted that the smooth change of position of the capsule from the radial to the longitudinal position is assisted by the rotary travel of the drum while the capsule pivots into the direction of travel. Yet notwithstanding the drag of the capsule on the interior of the guide, the capsule will not reseat itself radially into the pocket due to the size of the aligning space.

Referring now to the right capsule illustrated in FIG. 2, it will be observed that this capsule is oriented within the radially extending portion 44 in a position with the capsule body 50' extending radially downwardly and with the capsule cap 52' extending radially outwardly. Accordingly, when the jet of air from the air jet 62 is directed into the bottom of the pocket 40 in a manner to impinge upwardly upon the capsule 20', to force the capsule upwardly and radially outwardly from the pocket 40, the cap 52' will be urged toward engagement with the marginal edges 68, 70 which define the arcuate slot 60. However, as hereinbefore indicated, the width of the slot 60 is fabricated less than the diameter of the cap portion 52' and the marginal edges 68, 70 which define the slot 60 act to prevent the entrance of the capsule cap portion 52' into the slot 60. Under these circumstances, the capsule 20' cannot rise to pivot about the shoulder 48 and so will remain oriented within the pocket 40 in a radially directed position, with the capsule body 50' positioned downwardly within the radially extending pocket portion 44. Accordingly, in this capsule orientation, the air stream from the air jet 62 cannot urge the capsule 20' into its longitudinally aligned position within the longitudinally extending portion 44. As the feed drum 28 continues to rotate in the direction of the arrow 30, the interior surface 72 of the guide 58 will act to maintain the capsule 20' in its radially extended position.

Accordingly, after the capsules 20 are rotated past the air jet 62, the capsules 20 approach the interface 74 between the feed drum 28 and the transfer drum 34 in either a longitudinally oriented position with the capsule body 50 leading, as indicated at 76, or in a radially oriented position with the capsule body 50 extending radially inwardly as indicated at 78.

The distance from the face of the guide 58 facing the drum may be adjusted by adjusting the guide; likewise the width of slot 60 can be constructed to admit different sized capsules, i.e. of different diameters.

Still referring to FIG. 1, there is provided a stationary vacuum chest 112 which is located immediately adjacent to the inner surface of feed drum means 16 to aid in seating the capsules 20 within the respective feed drum pockets 40 as the capsules are fed from the hopper means 12. The vacuum within the chest 112 is communicated with the individual pockets 40 through small holes or conduits as the pockets are rotated past the chest upon rotation of the feed drum means 16 in the direction indicated by the arrow 30. A conduit 116 interconnects the vacuum chest 112 with a known vacuum source, which may be introduced immediately adjacent to the feed drum shaft 32.

Since the capsules generally fall into the cavity of the drum in a radial position, the vacuum chest is provided as a further aid, but is not a requirement, to assist in seating such capsules.

In the lower portion of the feed drum, below the horizontal at or approximately at the point of tangential contact of the feed drum 28 and the transfer drum 30 and the inclined bottom 24 of the hopper means 12, there is provided an air chest 118 immediately adjacent to the inner surface of the feed drum means 16. A conduit 120 communicates the interior of the air chest 118 with a known source of air, which souce may be introduced immediately adjacent to the feed drum shaft 32 in any suitable, known manner. The air means, as described above, assist in the transfer of the capsules from one drum to the other by creating a back pressure on the bottom of the capsule to assist in dislodging it.

Similarly, the transfer drum means 18 can be equipped with a vacuum chest 122 with intercommunicating vacuum conduit 124 to aid in the capsule transfer; and with an air chest 126 with intercommunicating air conduit 128 for clean out purposes.

The air chest 126 preferably is angularly spaced from vacuum chest 122 and is located below the horizontal in a position rotatively beyond the position at which the capsule is discharged from the transfer drum means 18. This vacuum chest also is not necessary to the operation and for the machinery of the invention.

As above set forth and as illustrated in FIG. 1, it will be noted that transfer drum 34 is configured similarly to feed drum 28 and includes a plurality of similarly positioned, circumferentially spaced pockets 42 which are rotated into registry beneath the feed drum pockets 40 as the transfer drum 34 is rotated in synchronism in the direction of the arrow 36. As was noted above, the pockets need not be identical with those in the feed drum. When a longitudinally aligned capsule which has been oriented as indicated at 76 in the feed drum means 16 approaches the interface 74, transfer from the feed drum 28 to the transfer drum 34 will occur assisted or principally by gravity, as well as by centrifugal force and momentum. The longitudinally oriented capsule will be received in the longitudinally extending pocket portion 46 of a transfer drum pocket 42 also in longitudinal alignment, as indicated at 80. It is noteworthy that the capsule body 50 will still be forwardly positioned in the desired orientation after transfer to the transfer drum 34.

When a radially positioned capsule 20 which is radially oriented within a feed drum pocket 40 as indicated at 78 approaches the interface 74, transfer from the feed drum 28 to the transfer drum 34 will occur assisted by or principally caused by gravity, as indicated at the numeral 82, as described above. It is noteworthy that after the transfer from the feed drum 28 to the transfer drum 34, the capsule 20 will still be radially oriented, but at this time within a transfer drum pocket 42. As illustrated, after transfer, the capsule cap 52 then will be downwardly or radially inwardly oriented within the radially extending portion 44 of the transfer drum pocket 42 as indicated at 84.

Referring to FIG. 1, it will be observed that the transfer drum means 18 includes an arcuate back guide 58' which includes an air jet 62' and an air jet opening 64'. The guide interior surface 72' defines an aligning space 66' between the back guide 58' and the outer periphery of the transfer drum 34. In the manner hereinabove set forth, the air jet 62' directs a stream of air through the opening 64' and into the bottom of each pocket 44 as the transfer drum 34 is rotated. Those capsules wherein the capsule body 50 has been radially positioned or oriented at transfer will be acted upon by the air stream.

The forces of the air blast will float the radially oriented capsules upwardly and out of the pocket portion 44 into the space 66' defined between the back guide 58' and the transfer drum 34. Elevation of a capsule 20 within its radial pocket portion 44 allows the capsule to pivot about the shoulder 48 as indicated at 110 to a longitudinally oriented position with the body portion 50 leading as indicated at 76'.

In this manner, all of the capsules 20 which were not longitudinally oriented by the feed drum means 16 at the upper feed drum 28 will be longitudinally oriented by the function of the transfer drum means 18 at the lower, transfer drum 34. The aligning space 66' defined between the periphery of the transfer drum 34 and the radially inward surface 72' of the guide 58' cams downwardly and serves to maintain the capsules 20 in their longitudinally oriented position as they are directed along the inward surface 72' of the guide 58', with the respective capsule bodies 50 extending forwardly and the respective capsule caps 52 extending rearwardly relative to the direction of travel.

Referring now to FIGS. 1 and 3, the lower back guide 58' terminates at its lower extremity 90 at an interface with pocket-carrier drum means 149. Pocket-carrier drum means 149 comprises generally a carrier drum 150 which is rotated in substantially tangential relationship below the transfer drum means 18 in the direction of arrow 198 by its associated shaft 152 in known manner. Shaft 152 is rotated in syncronism with the shafts 32,38 by a motor and drive apparatus (not shown) in suitable manner.

Carrier drum 150 generally comprises a plurality of carrier means 154 journalled for rotation within a plurality of cavities 156, preferably regularly spaced and peripherally positioned about carrier drum 150.

Cavities 156 comprise two, generally cylindrical, concentric portions 204, 206, lower portion 204 preferably having a smaller diameter than upper portion 206. Lower portion 204 is open at its bottom, permitting communication between the cavities 156 and the area centrally defined by the carrier drum 150. Upper portion 206 is open at its top.

Carrier means 154 comprise a lower, base portion 160 and an upper pocket containing portion 164, each of which is generally cylindrical in shape. Lower base portion 160 is preferably of a smaller diameter than is upper pocket portion 164, forming a flange 162 at the interface between portions 160, 164.

The base portion 160 of carrier means 154 is positioned within the lower portion 204 of cavity 156. Pocket containing portion 164 is positioned within the upper portion 206 of cavity 156. The flange 162 defined between base portion 160 and pocket containing portion 164 of carrier means 154 is positioned to seat upon the abutting shoulder 166 of cavities 156. The carrier means 154 may then be retained within the cavities 156 by a variety of attachment means 196, e.g. c-clip rings.

In this manner, the carrier means 154 are retained and journalled for rotation within the cavities 156 of carrier drum 150, the pocket containing portion 164 of the carrier means 154 extending to a point approximately in alignment with the surface of the carrier drum 150. Rotation of the carrier means 154 within the cavities 156 may be assisted by roller bearings 202, if desired, positioned between the surfaces defined by lower portion 204 of cavities 156, and base portion 160 of carrier means 154.

The pocket containing portion 164 of carrier means 154 are provided with uniformly configured, capsule receiving pockets or depressions 158. Pockets or depressions 158 are generally cylindrically configured, being sized to accept a capsule 20 therein in a manner which holds the capsule 20 in proper position during the printing process, and which also permits the capsules to axially spin during printing. Pockets 158 are also generally configured in a shape substantially equivalent to the peripheral shape of the longitudinally extending portions 44 of the pockets 42 of transfer drum 34. The carrier drum 150 and transfer drum 34 are operatively associated with each other so that the pockets 158 of the carrier drum 150 are brought into alignment with the longitudinally extending portions 44 of the pockets 42 of the transfer drum 34 as carrier drum 150 and transfer drum 34 are driven in synchronism, in the direction shown by arrows 198, 36 respectively. Consequently, a longitudinally oriented capsule 20, with its cap portion 52 trailing, is delivered from transfer drum 34 to carrier drum 150 in a longitudinal orientation with its cap portion 52 still trailing.

Extending longitudinally downward from base portion 160 is follower 168 which is offset from the axis of the carrier means 154, acting as an eccentric, and which, in combination with cam means 170, causes the carrier means 154 to rotate in a manner to be more fully described below. Cam means 170 is peripherally connected to a stationary barrel 172 which is concentrically positioned interior to carrier drum 150, and which is adjustably fixed in position by torque arm 174 and adjustment bracket 176. Sliding torque arm 174 along bracket 176 causes stationary barrel 172 to rotate, thereby retarding or advancing the timing function represented by cam means 170, and thus rotation of the carrier means.

A variety of camming means 170 may be used for this purpose. For example, a cam in the shape of a ring, peripherally extending around barrel 172, may be used in conjunction with carrier means 154 which are normally biased so that the pockets 158 are normally longitudinally oriented, such as by a spring or other similar mechanism. The follower 168 would then interact with the cam ring to cause the desired motor of carrier means 154. Cam means 170 may also be in the form of a slot or groove extending peripherally about barrel 172 which is positioned to engage follower 168 to cause carrier means 154 to rotate as required.

Also provided in conjunction with carrier drum 150 are spin printing apparatus 178 and delivery tray 180.

Spin printing apparatus 178 comprises a transfer roller 182 which is positioned to extend into a quantity of ink or dye 184 contained by reservoir 186. Ink or dye 184 is picked up by transfer roller 182 for application to print roller 188, which contains the indicia to be applied to the capsules 20 as they are passed beneath the peripheral edge of the print roller 188. Squeegee 190 is optionally provided to evenly distribute ink or dye 184 along transfer roller 182.

It is also possible to place additional printing apparatus 178 about the periphery of the carrier drum 150 in order to provide additional versatility to the printing operation. One such example of this is illustrated in FIG. 1 at 178'. Printing apparatus 178' is essentially similar to printing apparatus 178, however the print roller 188' would generally be provided with indicia different from those provided in conjunction with print roller 188. Print rollers 188, 188' could even be interchangeable if desired.

In order to further facilitate the printing process, it is not necessary that each printing apparatus be perpendicular to the capsule 20 which is being printed. Rather, the printing apparatus may be positioned at any angle between 30° and 90° to the capsule printing surface. In this manner, a wide variety of indicia may be applied to each capsule 20, including wording, markings, shapes, colors, etc.

Delivery tray 180 comprises a sloping base 192 and sides 194 which are positioned to catch a capsule 20 which has been printed as it rolls out of the pockets 158 of carrier drum 150. Printed capsules 20 are then caused to roll down the sloping base 192 toward subsequent capsule processing machinery, as illustrated by arrow 208.

In operation, capsules 20 are received from transfer drum 18 by the pockets 158 of the carrier drum 150 in a substantially longitudinal orientation, with their cap portion 52 trailing. As illustrated in FIGS. 3 and 4, as the carrier drum 150 rotates in the direction of arrow 198, the follower 168 of carrier means 154 is brought into contact with the timing incline 210 of cam means 170, shown at 212 in FIG. 1. The carrier means 154, which are normally biased so that pockets 158 are longitudinally oriented are thus caused to rotate about their axis, causing the pockets 158 to rotate from a substantially longitudinal alignment to a substantially transverse alignment. This transition is shown in FIGS. 1, 3 and 4 as follows. At position 214 the pocket 158 and capsule 20 are longitudinally positioned. At positions 216, 218, the pocket 158 and capsule 20 are rotating, as is the entire carrier means 154, in response to the interaction between the timing incline 210 of cam means 170 and follower 168. Finally, at position 220, the pocket 158 and capsule 20 contained therein are transversely oriented. The pockets 158, containing uniformly oriented, transversely aligned capsules 20, are then caused to advance beneath the print roller 188 whereupon the desired indicia may be applied to the capsules 20. As the print roller 188 passes over the surface of the capsules 20, the capsules 20 are permitted to axially spin, so that a clear, neat and sharp image is printed thereon.

After printing the capsules 20 are advanced to delivery tray 180 where they are permitted to roll out of the pockets 158, down the sloping base 192, toward subsequent capsule processing machinery, e.g. packaging. This process may be facilitated by air jet 198 which is directed toward the pockets 158 as they approach the delivery tray 180.

The empty carrier means 154 are then further rotated in the direction of arrow 198 toward a timing decline at 222 which returns the carrier means 154 to their original orientation. The pockets 158 of carrier means 154 are then caused to rotate back toward their original position, as follower 168 is caused to advance along the timing decline of cam means 170, at 222. The now longitudinally aligned pockets 158 of carrier means 154 are again ready to accept additional capsules 20 from transfer drum 34 for further printing and processing.

The positioning of timing incline 210 and timing decline 222 may be varied by rotating barrel 172 as previously described, permitting the movement of carrier means 154 to be advanced or retarded as desired. Timing functions other than that described above may be provided by varying the positioning of timing incline 210 and timing decline 222 with respect to carrier drum 150, or with respect to each other.

The foregoing apparatus is particularly well suited for the spin printing of selected indicia upon a plurality of capsules 20. However, the foregoing apparatus is also capable of use in conjunction with other printing techniques. The timing function represented by cam means 170 may be varied if needed. If desired, cam means 170 may even be removed, allowing the pockets 158 to remain substantially longitudinally aligned throughout the entire process. Many variations are clearly possible.

Although the foregoing discussion illustrates use of only a single row of carrier means 154, it is also equally possible to provide a plurality of juxtaposed, peripherally spaced rows of carrier means 154, to accept a plurality of capsules 20 from a plurality of rows provided in feed drum 28 and transfer drum 34.

Although the invention has been described with particular reference to capsules, it is intended and contemplated that any material whatever may be processed in and in accordance with the apparatus and process of the invention whenever the materials processed have two ends and it is desired to position, orient or arrange these materials with one selected end forward and the other trailing prior to printing indicia on such materials. It is to be noted in that connection that the materials can be hollow or not filled or filled, etc. Also, it is not necessary that the material have a so called cap and body portion, as is illustrated by way of example only, but the material may have a protrusion or asperity or other means or other shape, or be of such configuration that the one end of the body will not enter into slot or space 60', thus selectively permitting the body to enter the space by one of its ends but not by the other.

Moreover, the pocket carrier drum means 149 is not only applicable for use in conjunction with materials having dissimilar ends, which must be rectified or oriented prior to entering printing operations. Many applications call for the applying of indicia to materials or bodies having similar ends, such as pellets, tablets or soft gelatin capsules, which materials either have or have not been previously classified or oriented. The pocket carrier drum means 149 of the present inventions is well suited for use in conjunction with such materials.

Irrespective of the materials involved, the present inventions provides a rotary printing means capable of applying indicia to a wide variety of objects which are capable of rotation beneath a printing means, principally a spin printing device, along a curved path defined by the movement of the carrier means 154 about carrier drum 150, rather than the linear path used in conjunction with prior art printing devices.

To be noted too is that other equivalent means to the air jet means are contemplated to move the body out of the pocket. Such means need not be positioned outwardly of the drums, but it is contemplated that it could be positioned inwardly the drum to urge the body upwardly towards slot 60.

It is noteworthy also that back guide 58' can be provided with an arcuate slot (similar to 60), like back guide 58, but that would be unnecessary since rectification of the capsules will have already been performed by back guide 58. However, such provision makes the two back guides interchangeable on the machinery.

Although this invention has been described in conjunction with certain specific forms and certain modifications thereof, it will be appreciated that a wide variety of other modifications can be made without departing from the spirit of the invention. For example, some of the features of the invention may be used independently of other features, including the use or non-use of the vacuum chest and the use or non-use of other means. The capsule turning is capable of uses independent of spin printing, although it is admirably adapted for that use.

Especially equivalent means to achieve the stated and implicit objectives are within the scope of the invention. Moreover, several described components are optional, as described above. Accordingly, in accordance with this invention, various equivalent elements may be substituted for those shown and specifically described, and in many instances parts may be reversed in ways which will become apparent to those skilled in the art, all without departing from the scope and spirit of this invention as defined in the appended claims.

Although the invention has been described with a certain degree of particularity, it is understood that the present disclosure has been made only by way of example and that numerous changes in the details of parts may be resorted to without departing from the scope of the invention.

What is claimed is:

1. An apparatus for receiving in a longitudinal orientation a plurality of materials having a body portion and a cap portion, the cap portion being larger than the body portion, from a transfer drum means for further processing, the materials having been delivered by the transfer drum means in a rectified condition, which apparatus comprises pocket carrier drum means in rotary arrangement relative to the transfer drum means, to receive the materials from the transfer drum means, the pocket carrier drum means having a plurality of cavities peripherally spaced along its circumference, which cavities contain a plurality of carrier means journalled for rotation within the cavities, which carrier means include longitudinally aligned pockets for retaining in position the plurality of materials received from the transfer drum means, means for rotating the carrier means relative to the pocket carrier drum means so that the materials are rotated from the longitudinal position in which they are received by the pocket carrier drum means to a position transverse to the direction of their motion.

2. The apparatus of claim 1 wherein the plurality of materials are capsules which have one end larger than the other.

3. The apparatus of claim 1 wherein the pockets of the carrier means are configured to a shape substantially equivalent to the peripheral shape of the materials, and to permit the materials to axially rotate within the pockets.

4. The apparatus of claim 1 wherein the rotating means comprises follower means connected to the carrier means, longitudinally depending from the carrier means and extending through openings at the bottom of the cavities, which depending follower means are offset from the axis of the carrier means, and cam means, operatively associated with the follower means, to rotate the carrier means as the follower means is brought into contact with the cam means.

5. The apparatus of claim 4 wherein the carrier means further comprises means for normally biasing the pockets of the carrier means in a substantially longitudinally orientation.

6. The apparatus of claim 5 wherein the cam means extends circumferentially around the interior of the pocket carrier drum means, beneath the openings at the bottom of the cavities.

7. The apparatus of claim 6 further comprising barrel means concentrically and internally positioned with respect to the pocket carrier drum means, to which barrel means is peripherally connected the cam means.

8. The apparatus of claim 7 further comprising means for altering the position of the barrel means relative to the pocket carrier drum means, to thereby alter the timing represented by the cam means.

9. The apparatus of claim 8 wherein the position altering means comprises a torque arm adjustably connected to a bracket which is fixedly mounted to a surface.

10. The apparatus of claim 5, further comprising means for receiving materials discharged from the pockets of the carrier means, for delivery for subsequent processing, and further comprising cam means operatively associated with the follower means, positioned downstream from the capsule receiving means, to permit the carrier means to return to the normally biased orientation.

11. The apparatus of claim 1 further comprising means for applying indicia to the materials, positioned downstream of the rotating means, as the materials are moved beneath the indicia applying means by the pocket carrier drum means.

12. The apparatus of claim 11 wherein the indicia applying means is a spin printing apparatus comprising a printing roller containing the indicia to be applied to the materials, which printing roller is tangentially positioned relative to the pocket carrier drum means, and a transfer roller, tangentially positioned relative to the printing roller and extending into a reservoir containing an ink which is delivered from the transfer roller to the printing roller.

13. The apparatus of claim 12 wherein the printing roller is positioned relative to the carrier means of the pocket carrier drum means so that materials contained in the pocket of the carrier means are brought into contact with the printing roller as they are passed beneath the printing roller by the pocket carrier drum means.

14. The apparatus of claim 13 wherein the frictional forces produced as the materials are brought into contact with the printing roller causes the materials to axially spin within the pocket of the carrier means.

15. The apparatus of claim 1 further comprising means for receiving materials discharged from the pockets of the carrier means, for delivery for subsequent processing.

16. The apparatus of claim 15 further comprising means for assisting the materials in being discharged from the pockets of the carrier means.

17. The apparatus of claim 16 wherein the assisting means is an air jet adapted to direct a stream of air into the pockets of the carrier means as they approach the material receiving means.

18. The apparatus of claim 1, wherein each of the pockets is adapted to hold one of said materials substantially in its entirety.

19. The apparatus of claim 1, further comprising spin printing means, disposed in tangential relation to the pocket carrier drum means, for printing indicia on the materials as the materials are carried within the pockets.

20. A process for receiving in a longitudinal orientation a plurality of materials having a body portion and a cap portion, the cap portion being larger than the body portion, from a transfer drum means for further processing, which method comprises positioning and reorienting the materials from a random arrangement to a rectified position wherein the materials are longitudinally aligned, receiving the materials from the transfer drum means by transferring the received materials to a plurality of pockets for retaining the received materials in position, which pockets are located within a plurality of carrier means journalled for rotation within a plurality of cavities peripherally spaced along the circumference of a pocket carrier drum means in rotary arrangement relative to the transfer drum means, and rotating the materials contained by the plurality of pockets relative to the pocket carrier drum means so that the materials are rotated from the longitudinal position in which they are received by the pocket carrier drum means to a position transverse to the direction of their motion.

21. The process of claim 20 further comprising applying indicia to the materials as they are rotated beneath a means for applying indicia to the materials.

22. The process of claim 21 wherein the indicia applying is performed by spin printing indicia on the materials.

23. The process of claim 22 wherein the spin printing is performed upon a curved surface.

24. The process of claim 22 further comprising axially rotating the materials within the pockets during the spin printing.

25. The process of claim 33 further comprising delivering the materials to which indicia have been applied from the pockets to additional material processing means.

26. The process of claim 25 further comprising assisting the delivering of the materials from the pockets.

27. The process of claim 25 further comprising rotating the pockets of the carrier means to their original orientation to accept additional materials for processing therein.

28. The process of claim 20 wherein the rotating of the pockets of the carrier means is variable in time.

29. The process of claim 20 wherein the plurality of materials are capsules which have one end larger than the other, and further comprising, before receiving the capsules from the source, positioning and reorienting the capsules from a random arrangement to a rectified position wherein the capsules are longitudinally aligned.

30. An apparatus for receiving a plurality of materials from a source for further processing, which apparatus comprises
  pocket carrier drum means in rotary arrangement relative to the source, to receive the materials from the source the pocket carrier drum means having a plurality of cavities peripherally spaced along its circumference, which cavities contain a plurality of carrier means journalled for rotation within the cavities, and which carrier means include pockets for retaining in position the plurality of materials received from the source,
  means for rotating the carrier means relative to the pocket carrier drum means so that the materials are rotated from the position in which they are received by the pocket carrier drum means to another selected position,
  the plurality of materials being capsules which have one end larger than the other,
  the source being an apparatus for rectifying the capsules for delivery to the capsule receiving apparatus for further processing which rectifying apparatus includes a hopper adapted to contain a plurality of the capsules in random orientation, which rectifying apparatus comprises:
  feed drum means in rotary arrangement relative to the hopper to receive capsules from the hopper;
    said feed drum means comprising a plurality of peripherally spaced first pockets each adapted to receive one of said capsules therewithin;
    said first pockets comprising a radially extending cavity and an intercommunicating longitudinally extending cavity;
  first means which cooperates with said feed drum for selectively reorienting some of the capsules which are radially aligned in said pockets to a longitudinally aligned position within the longitudinally extending portion of the pockets;
  transfer drum means in a substantial tangential rotary association with the feed drum means to receive the longitudinally aligned capsules from the feed drum means;
    said transfer drum means comprising a plurality of peripherally spaced second pockets adapted to be rotated into registry with the first pockets to effect capsule transfer therebetween;
    said second pockets comprising a longitudinally extended cavity for receiving the capsules in longitudinal orientation and a radially extending cavity for receiving the capsule in radial orientation;
    said transfer drum means further comprising second means which cooperates with said drum for reorienting the capsules which are radially aligned in said pockets to a longitudinally aligned position within the longitudinally extending portion of the pockets;
  whereby all of the capsules are oriented from a random orientation to a longitudinally oriented position for delivery to the material receiving apparatus.

31. The apparatus of claim 30 wherein the first means for selectively orienting comprises a first back guide in circumferentially overlying relationship to the feed drum, said first back guide retaining the capsules within the first pockets as the first pockets are rotated to positions below the horizontal.

32. The apparatus of claim 31 which comprises means for preventing the reorientation from the radial alignment to the longitudinal alignment of those capsules which are not reoriented from the radial to the longitudinal alignment.

33. The apparatus of claim 32 wherein the first back guide is provided with an arcuate slot, open in a direction facing the feed drum, which slot is too small to receive the larger of the two ends of the capsule but large enough to receive the other end.

34. The apparatus of claim 30 wherein the first means comprises means for assisting in the reorientation of the capsule from the radial to the longitudinal position.

35. The apparatus of claim 30 wherein the transfer drum comprises means for changing the position of a capsule in the pocket from radially aligned to longitudinally aligned within that of the pocket.

36. The apparatus of claim 35 wherein the capsules each have a body and an overfitting cap and wherein the first orientation means to orient the capsules includes means to position said longitudinally positioned capsules with the respective bodies all facing in the same direction.

37. The apparatus of claim 36 wherein the said direction is in the direction of feed drum rotation.

38. The apparatus of claim 30 wherein the pockets of the carrier means have substantially the same peripheral configuration as the longitudinally extended cavities of the second pockets.

39. A process for receiving a plurality of materials from a source for further processing, which method comprises
  receiving the materials from the source by
  transferring the received materials to a plurality of pockets for retaining the received materials in position, which pockets are located within a plurality of carrier means journalled for rotation within a plurality of cavities peripherally spaced along the circumference of a pocket carrier drum means in rotary arrangement relative to the source, and
  rotating the materials contained by the plurality of pockets relative to the pocket carrier drum means so that the materials are rotated from the position in which they are received by the pocket carrier drum means to another selected position,
  the materials being longitudinally transferred to the pockets,
  the plurality of materials being capsules which have one end larger than the other, the process further comprising, before receiving the capsules from the source, positioning and reorienting the capsules from a random arrangement to a rectified position wherein the capsules are longitudinally aligned, the positioning and reorienting steps comprising:

transferring capsules which are in random arrangement to a position in substantially radial position in a pocket in a rotary means with some capsules having the larger end extending radially downwardly and the other capsules having the larger end extending radially upwardly;

selectively reorienting the capsules which have their larger end extending radially downwardly to its longitudinally aligned position with the smaller end forwardly positioned, while the capsules which have their larger end extending radially upwardly remain in the radial position;

transferring said capsules in their radial and longitudinal position to the corresponding position in a corresponding pocket in another rotary means, thereby causing the capsules which have their larger end extending radially upwardly to be positioned in the corresponding pocket with their larger end extending radially downwardly; and reorienting the capsules which have their larger end extending radially downwardly to its longitudinally aligned position with the smaller end forwardly positioned so that all capsules are traveling longitudinally with their smaller end forwardly positioned.

40. The process of claim 39 wherein the capsules are transferred from their radially aligned position to the correspondingly radially aligned position directly without transfer through another plane.

41. The process of claim 39 wherein the selective reorienting of the capsules which have their larger end extending radially downwardly to its longitudinally aligned position with the smaller end positioned forwardly, is assisted by means of air.

42. The process of claim 39 which comprises preventing by means of a stop means the capsules which have their larger end extending radially upwardly from being reoriented into a longitudinally aligned position while the capsules which have their larger end extending radially downwardly are reoriented into a longitudinally aligned position.

* * * * *

UNITED STATES PATENT AND TRADEMARK OFFICE
CERTIFICATE OF CORRECTION

PATENT NO. : 4,266,478
DATED : May 12, 1981
INVENTOR(S) : E. Michael Ackley

It is certified that error appears in the above—identified patent and that said Letters Patent is hereby corrected as shown below:

In Claim 25, line 67, delete "33" and insert --21--.

Signed and Sealed this

Eighth Day of November 1983

[SEAL]

Attest:

GERALD J. MOSSINGHOFF

Attesting Officer  Commissioner of Patents and Trademarks